United States Patent [19]
Jelinek et al.

[11] Patent Number: 6,112,997
[45] Date of Patent: Sep. 5, 2000

[54] CHIP CARD AND CHIP CARD READER

[75] Inventors: Egbert Jelinek, Sarstedt; Stefan Goss, Hildesheim, both of Germany

[73] Assignee: Robert Bosch GmbH, Stuttgart, Germany

[21] Appl. No.: 08/930,928

[22] PCT Filed: Nov. 13, 1997

[86] PCT No.: PCT/DE96/02158

§ 371 Date: Oct. 6, 1997

§ 102(e) Date: Oct. 6, 1997

[87] PCT Pub. No.: WO97/33246

PCT Pub. Date: Sep. 12, 1997

[30] Foreign Application Priority Data

Mar. 8, 1996 [DE] Germany ............ 196 08 990

[51] Int. Cl.$^7$ ............................................. G06K 19/06
[52] U.S. Cl. ............................................ 235/492; 235/441
[58] Field of Search ........................ 235/492, 441, 235/380, 486

[56] References Cited

U.S. PATENT DOCUMENTS

| | | | |
|---|---|---|---|
| 4,749,982 | 6/1988 | Rikuna et al. ............ | 235/380 |
| 4,752,234 | 6/1988 | Reichardt et al. ........ | 439/260 |
| 4,918,631 | 4/1990 | Hara et al. ............... | 235/380 |
| 4,931,622 | 6/1990 | Ohtsuki et al. .......... | 235/441 |
| 5,286,957 | 2/1994 | Defrasne ................. | 235/441 |
| 5,332,890 | 7/1994 | Kitahara ................. | 235/441 |
| 5,362,955 | 11/1994 | Haghiri-Tehrani ...... | 235/492 |
| 5,980,323 | 11/1999 | Bricaud et al. ......... | 439/630 |

FOREIGN PATENT DOCUMENTS

| | | | |
|---|---|---|---|
| 0357827 | 3/1990 | European Pat. Off. ...... | 235/440 |
| 19501620A1 | 7/1996 | Germany . | |

OTHER PUBLICATIONS

W. Rankl and W. Effing,; Smart, Card Hand Book, Published by John Wiley &Sons, 1995, p. 17–23.

Primary Examiner—Karl D. Frech
Assistant Examiner—Diane I. Lee
Attorney, Agent, or Firm—Michael J. Striker

[57] ABSTRACT

A chip card (1) has reading and/or writing contacts (10, ..., 17) to provide electrical contact with corresponding fixed countercontacts (20, ..., 27) of a card reader with a card slot for receiving the chip card (1). The contacts (10, ..., 17) are formed so that they maintain the electrical contact during an overshot, which occurs particularly when the chip card (1) is inserted into the card slot, and/or during a time required to end a writing operation on removal of the chip card (1) from the card slot, and/or during reciprocation occurring crosswise to the direction of insertion of the chip card (1) into the card reader, especially upon insertion or removal of the chip card (1). The contacts (10, ..., 17) are formed so that, when the countercontacts (20, ..., 27) sweep over the contacts (10, ..., 17), no short circuit occurs between individual contacts (10, ..., 17). A card reader for the chip card has a card slot for receiving the chip card (1) and countercontacts (20, ..., 27) for mechanical cooperation with the reading and/or writing contacts (10, ..., 17) on the chip card and for electrically conductive connection of a computer to the contacts (10, ..., 17). The countercontacts (20, ..., 27) are rounded off in and/or crosswise to the direction of insertion of the chip card (10) into the card reader. The radius of curvature is selected so that when the counter contacts (20, ..., 27) sweep over the contacts (10, ..., 17) of the chip card (10), no short circuit occurs between individual contacts (10, ..., 17).

9 Claims, 7 Drawing Sheets

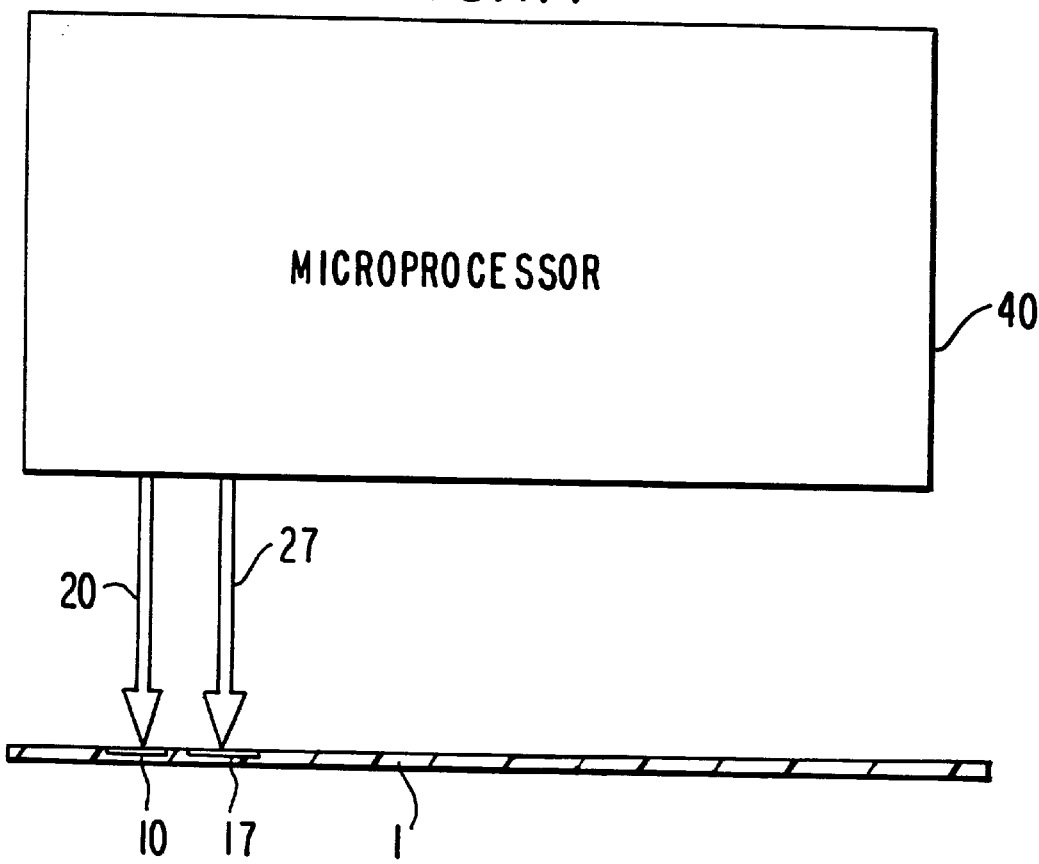
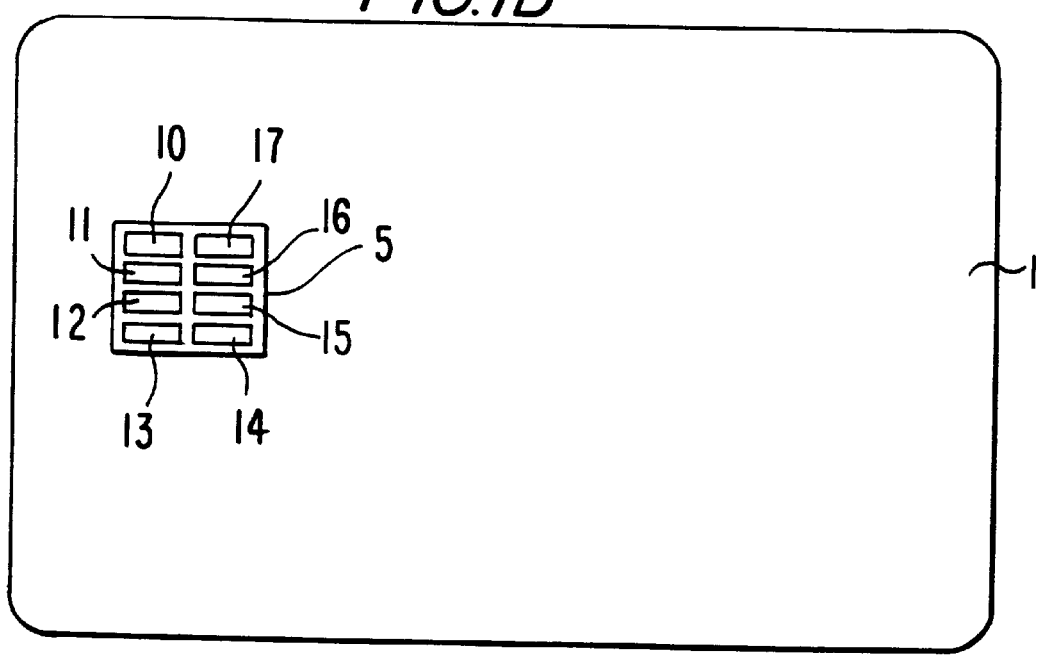

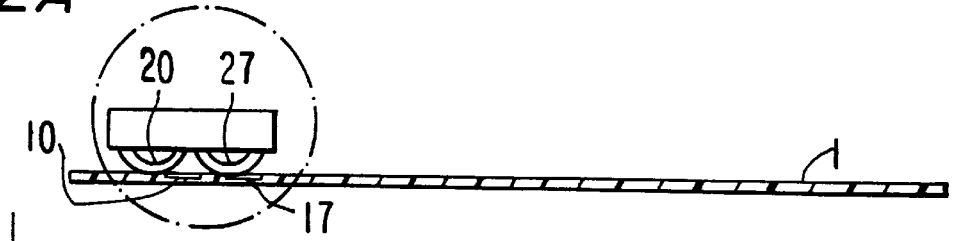
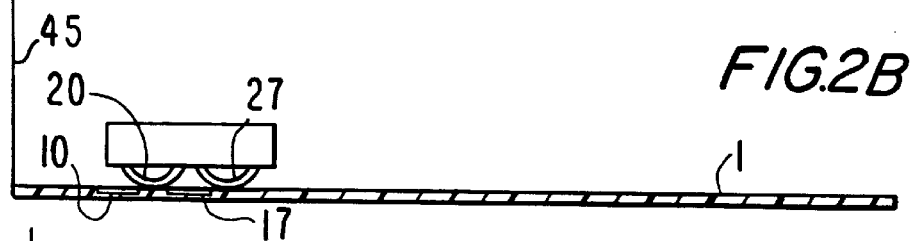
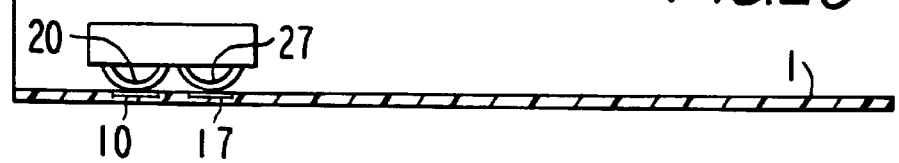
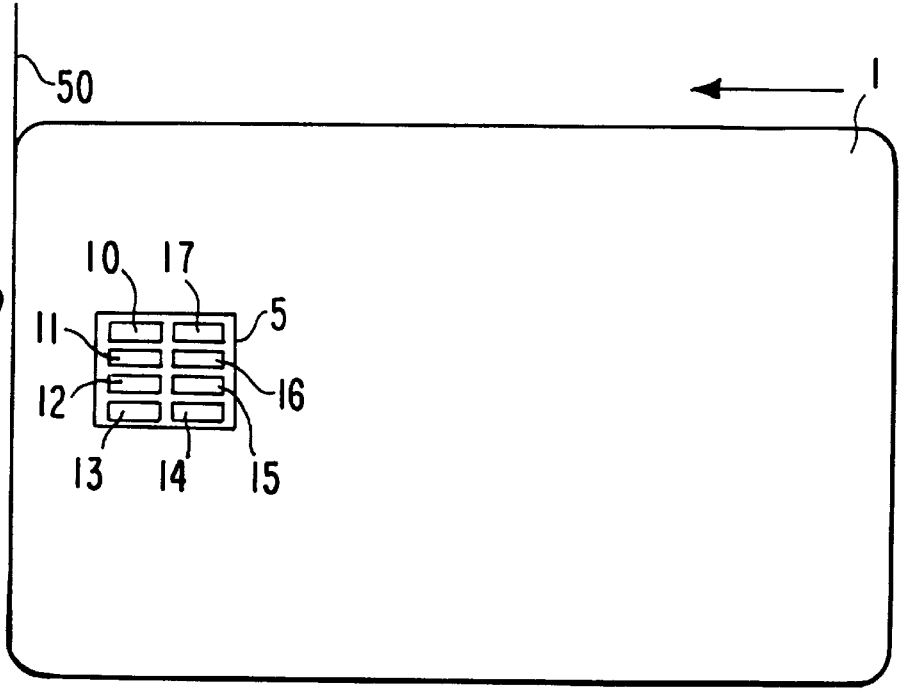

CHIP CARD AND CHIP CARD READER

BACKGROUND OF THE INVENTION

1. Field of the Invention

The present invention relates to a chip card with writing and/or reading contacts on its surface which provide electrical contact with corresponding fixed countercontacts of a card reader with a card slot for receiving the chip card. It also relates to a card reader for this chip card.

2. Prior Art

From German Patent application 19 501 620, which had not been published by the filing date of the present application, a card reader for chip cards is known which includes a contact arrangement with contacts that are electrically conductively connected to the contacts of the chip card microchip when the chip card is locked in the card slot of the card reader. The contacts of the contact arrangement are lengthened in the insertion direction of the chip card far enough that the connection with the contacts on the chip card is maintained even when the withdrawal of the chip card has been begun.

SUMMARY OF THE INVENTION

According to the invention the chip card comprises writing and/or reading contacts arranged on a surface of the chip card, which act to provide electrical contact with corresponding fixed countercontacts of a card reader provided with a card slot for receiving the chip card, wherein the contacts are dimensioned, formed and arranged on the surface so as to maintain the electrical contact with the countercontacts when the chip card is guided into an overshot position in the card slot beyond a terminal position in which the contacts contact the middle of the countercontacts when the chip card is inserted in the card slot of the card reader, and/or during a time required to end a writing operation upon removal of the chip card from the card slot, and/or during reciprocation transverse to an insertion direction of the chip card into the card reader, occurring particularly upon insertion or removal of the chip card.

The chip card according to the invention, has the advantage over the prior art that by suitable embodiment of the contacts on the surface of the chip card, it is unnecessary to lengthen the countercontacts of the card reader, yet the electrical contacting upon removal of the chip card is preserved for a certain length of time, which suffices to end a writing operation that is still in progress. This makes for economy of effort and material in the production of the countercontacts. As a rule, the contacts are connected electrically conductively to a microchip contained in the chip card. In that case, for design reasons, the contact faces typically extend over the entire length of the corresponding chip module on the surface of the chip card. Contact faces that are not needed are connected to the reference potential, for instance. The embodiment of the contacts according to the invention accordingly requires merely a suitable distribution of contact faces on the surface of the chip card, and compared with the conventional distribution of the contact faces, it entails no added expense.

A further advantage of the embodiment of the contacts according to the invention is that data transfers between the chip card and the card reader can be performed or brought to an end without interruption, not only while the chip card is being removed but also while it is being inserted with an attendant overshot, and upon motions of the chip card crosswise to the direction of insertion of the chip card and to the card reader.

Advantageous further features of and improvements to the chip card according to the invention are possible.

In a preferred embodiment of the chip cards when the countercontacts sweep over the contacts, no short circuit between individual contacts can occur. This prevents short-circuiting from causing data losses or destruction of the microchip or electronic components of the card reader.

The card reader according to the invention has the advantage that by rounding off the countercontacts in and/or crosswise to the direction of insertion of the chip card into the card reader, the insertion and removal of the chip card cannot be blocked by the countercontacts.

It is considered a further advantage that the bearing surface area of the countercontacts on the chip card or the contacts of the chip card is reduced, and in this way a smaller spacing among the contacts on the chip card can be achieved without resulting in a short circuit when the countercontacts sweep over the contacts of the chip card. By means of the further lengthening of the contact faces that is enabled in this way, the electrical contacting can be maintained even longer when the chip card is being inserted or removed.

In a preferred embodiment of the card reader the countercontacts have a radius of curvature in the insertion direction and/or transverse to the insertion direction selected so that, when the countercontacts sweep over the contacts of the chip card, no two contacts are contacted by any countercontact located between them, so that no short circuit occurs between them. Particularly, the radius of curvature of the countercontacts in the insertion direction of the chip card into the card reader is at most 3.3 mm, and the radius of curvature of the countercontacts in a direction transverse to the insertion direction is at most 2 mm.

An advantage of card reader according to the invention is that the adaptation of the radius of curvature for the countercontacts to the dimensions and spacings of the contacts of the chip card. In this way, short circuits between individual contacts and hence data losses or the destruction of the microchip or of electronic components of the card reader are prevented.

BRIEF DESCRIPTION OF THE DRAWING

The objects, features and advantages of the invention will now be illustrated in more detail with the aid of the following description of the preferred embodiments, with reference to the accompanying figures in which:

FIGS. 1a) and 1b) are respectively a diagrammatic side view and top plan view of a part of a chip card reader and a chip card according to the invention;

FIGS. 2a), 2b) and 2c) are diagrammatic side action views showing the electrical contacting of the contacts of the chip card by the countercontacts when the card is inserted in the direction of the arrow, especially FIG. 2b) shows the overshot position;

FIG. 2d) is a top plan view of the chip card showing the various electrical contacts on the microchip module 5;

DESCRIPTION OF THE PREFERRED EMBODIMENT

Figure 3A:
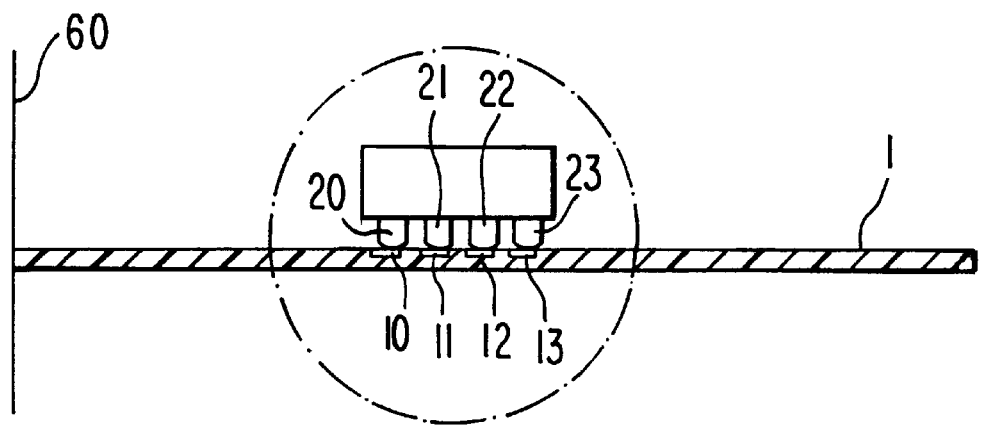
FIGS. 3a) and 3b) are side action views showing electrical contacting of contacts of the chip card by the countercontacts during motion of the chip card crosswise to the insertion direction.

In FIGS. 1*a*) and 1*b*) reference numeral 1 indicates a chip card with a microchip module 5. On the surface of the chip card, in the region of the microchip module 5, eight contacts 10, 11, 12, 13, 14, 15, 16, 17 are mounted and connected electrically conductively to the microchip. They serve to provide electrical contact with eight corresponding fixed countercontacts 20, . . . , 27 of a card reader that has a card slot for receiving the chip card 1. In FIGS. 1*a* and 1*b* the electrical contacting of the first and eighth contacts 10 and 17 of the chip card 1 with the first and eighth countercontacts 20 and 27 of the card reader is shown. The countercontacts 20, . . . , 27 are electrically conductively connected to a microprocessor 40 of the card reader. The contacts 10, . . . , 17 on the surface of the chip card 1 are arranged such that two contacts each in the insertion direction, indicated by an arrow, and four contacts each crosswise to the insertion direction are disposed side by side. In FIGS. 1*a* and 1*b*, the chip card 1 is introduced lengthwise into the card slot of the card reader. However, it is also conceivable for the chip card 1 to be introduced widthwise into a corresponding card slot. In that case, the arrangement of the contacts 10, . . . , 17 on the surface of the chip card 1 would have to be rotated by 90° from what is shown in FIGS. 1*a* and 1*b*. It does not matter hereinafter whether the chip card 1 is to be introduced into a card slot lengthwise or widthwise, since the disposition of the contacts 10, 17 in the insertion direction is always the same. By means of the electrical contacting of the contacts 10, . . . , 17 with the corresponding countercontacts 20, . . . , 27, writing and/or reading operations on the microchip of the chip card 1 are possible with the aid of the microprocessor 40.

The electrical contacting schematically shown in FIGS. 1*a* and 1*b* is shown more realistically in FIGS. 2*a*), 2*b*), 2*c*) and 2*d*). It can be seen in FIGS. 2*a*), 2*b*), and 2*c*) that the countercontacts 20, . . . , 27 are rounded off. FIGS. 2*a*), 2*b*), and 2*c*) shows three positions of the chip card 1 as it is being inserted into the card slot of the card reader. In the upper view A, the chip card 1 is introduced into the card slot in the direction of the arrow, and the countercontacts 20, . . . , 27 are already touching the contacts 10, . . . , 17 even though the chip card 1 has not yet reached a terminal position 50 in the card slot of the card reader. In this way, initial data can already be exchanged, such as data that signal the onset of electrical contacting to the microprocessor 40 of the card reader. The microprocessor 40 can then initiate further writing and/or reading operations. Because of the length of the contacts 10, . . . , 17, the electrical contacting is preserved until the chip card 1 strikes the bottom 45 of the slot in the card reader, in the card position B of shown in FIG. 2*b*). At that point, the chip card 1 is in an overshot position, because the bottom 45 of the slot does not match the terminal position 50, and the chip card 1 is pressed backward into the terminal position 50 for instance by a spring mounted on the slot bottom 45. The chip card 1 is then in the card position C shown in FIG. 2*c*), and the electrical contacting of the countercontacts 20, . . . , 27 with the contacts 10, . . . , 17 is in the middle. If the chip card 1 is taken out of the card reader during a writing operation, then the contacting must be maintained for a time required to end the writing operation, because otherwise there is a risk of losing data. The writing operation lasts a maximum of 50 ms. Given a sufficient length of the contacts 10, . . . , 17, the contacting can be maintained until the termination of the writing operation. In this way, the writing operation, upon removal of the chip card 1 from the card slot, must be ended at the latest by when the chip card 1 has reached the card position A in FIG. 2*a*).

Figure 3B:
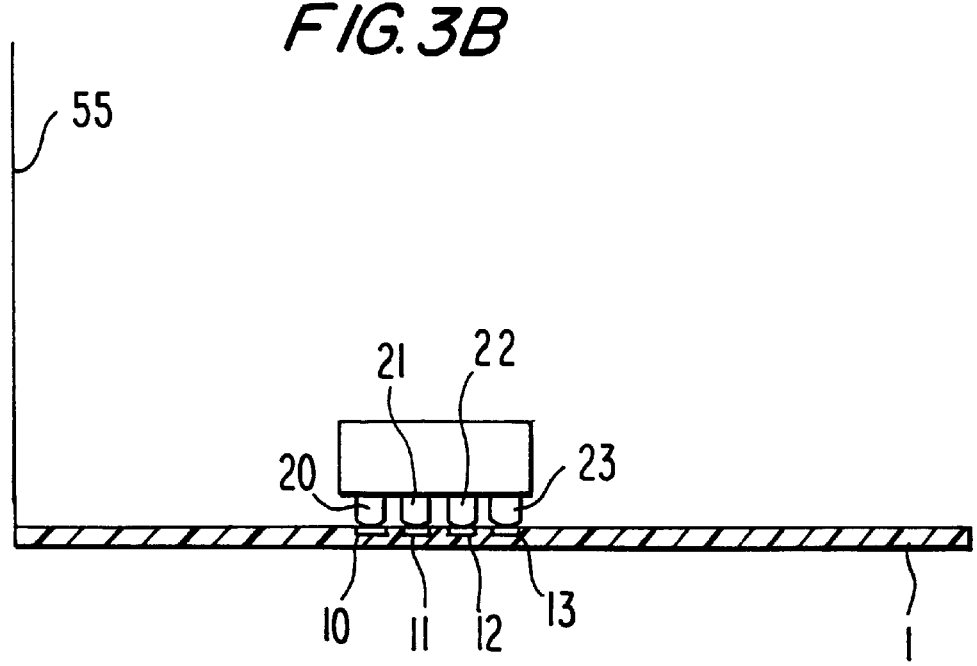

Since the dimensions of the card slot, for easy card insertion and removal, must be wider than the chip card 1 itself, card reciprocation crosswise to the insertion direction can happen, especially when the chip card 1 is being inserted or removed. Such a situation is shown in FIGS. 3*a*) and 3*b*). A lateral normal position 55 of the chip card 1 in the card slot of the card reader, which position correspondingly extends crosswise to the terminal position 50, can be exceeded by the lateral reciprocation of the chip card 1 until it meets the side wall 60 of the card slot. Such a situation is shown as the card position A in FIG. 3*a*). The four contacts 10, . . . , 13 shown, because of their width, have contact with the corresponding countercontacts 20, . . . , 23 despite the lateral reciprocation of the chip card 1, so that the contacting is maintained during this lateral reciprocation. At card position B of FIG. 3*b*), the chip card 1 has assumed its lateral normal position 55, and the electrical contacting of the contacts 10, . . . , 13 with the corresponding countercontacts 20, . . . , 23 takes place in the middle.

Figure 4:
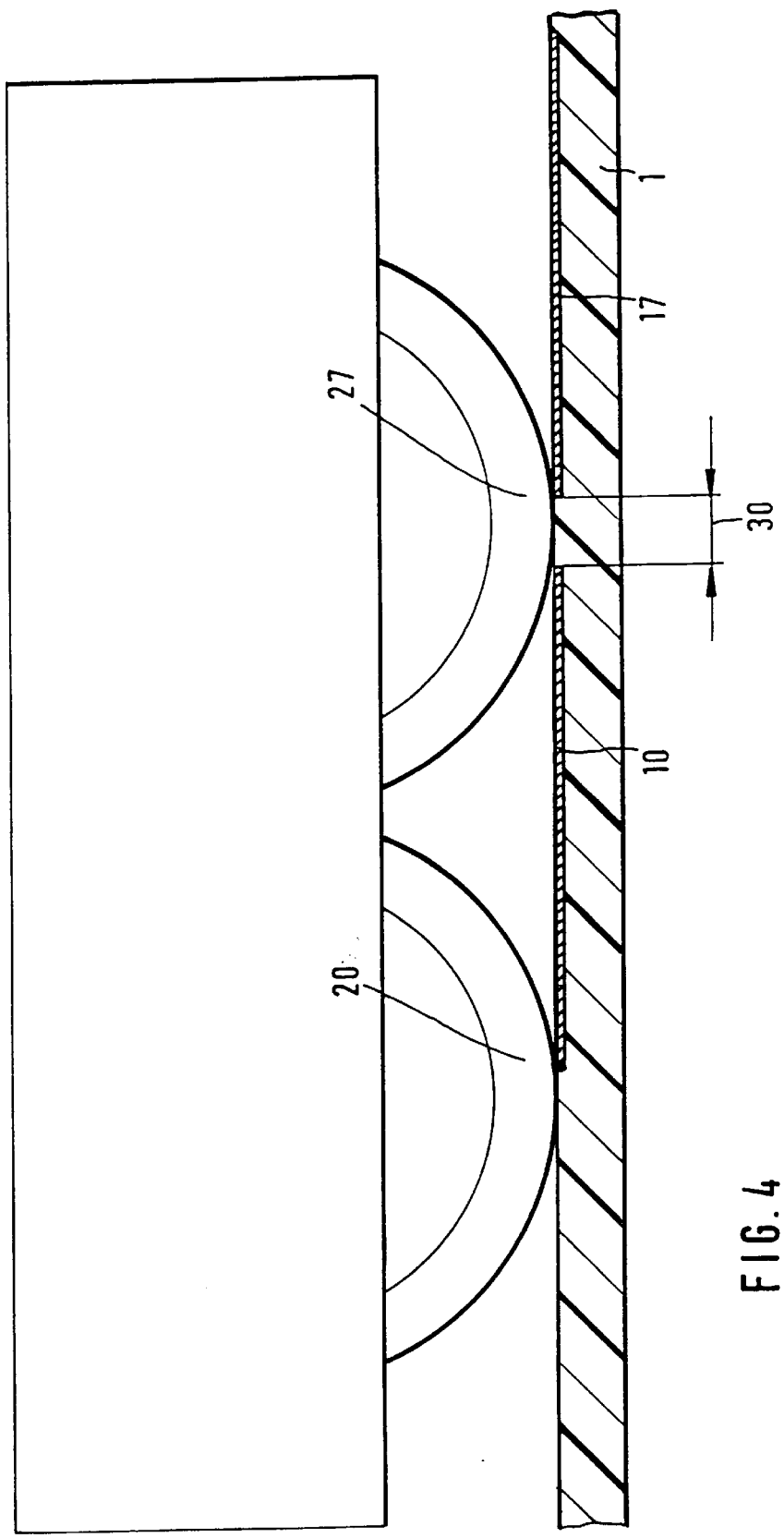
FIG. 4 is a detailed side view of a portion of the device shown in FIG. 2.

FIG. 4 is a detailed view of the region in the dot-dashed circle in FIG. 2*a*). The spacing 30 in the insertion direction between the two contacts 10 and 17 is shown as an example here. This spacing must be greater than the length of the countercontact face of the corresponding countercontact 20, . . . , 27 in the same direction. Otherwise, when the countercontacts 20, . . . , 27 sweep over the contacts 10, . . . , 17, a short circuit will occur between individual contacts 10, . . . , 17. Such a short circuit can cause data loss or even the destruction of the microchip and/or of the microprocessor 40.

Figure 5:
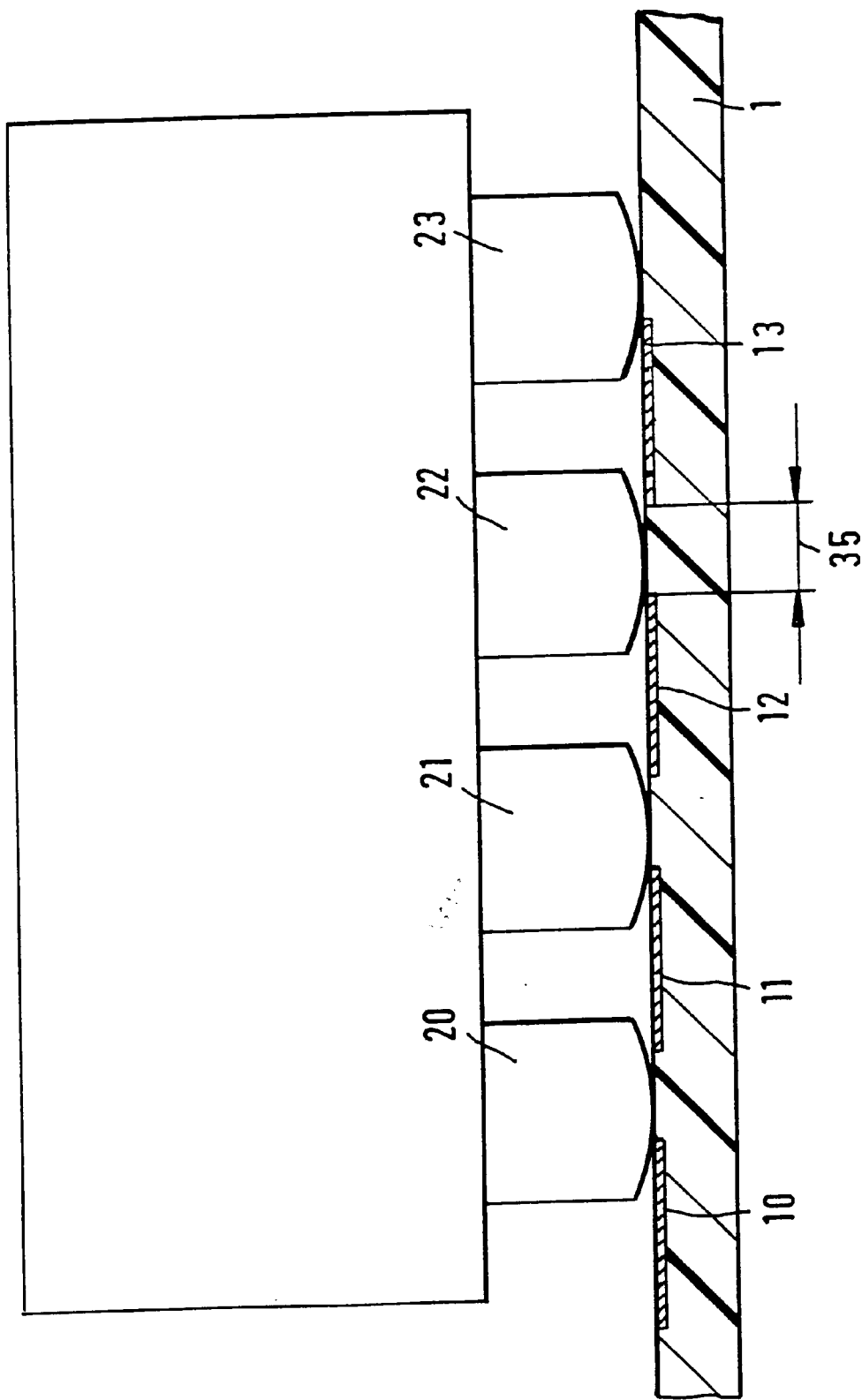
FIG. 5 is a detailed side view of a portion of the device shown in FIG. 3.

FIG. 5 is a detailed view of the region in the dot-dashed circle in FIG. 3*a*). This shows the spacing 35 between the two contacts 12 and 13 that are adjacent one another crosswise to the direction of insertion of the chip card 1 into the card reader. This spacing must be greater than the length of the countercontact face of the corresponding countercontact 20, . . . , 27 in the same crosswise direction. Otherwise, as the countercontacts 20, . . . , 27 sweep over the contacts 10, . . . , 17, a short circuit between individual contacts 10, . . . , 17 will occur. However, the intent is to prevent any attendant data loss, or the destruction of the microchip and/or the microprocessor 40.

To prevent these short circuits, the dimensions of the contacts 10, . . . , 17 and the radii of curvature of the countercontacts 20, . . . , 27 should be adapted to one another. The countercontacts 20, . . . , 27 are also rounded off crosswise to the direction of insertion of the chip card 1 into the card reader, so that crosswise to the direction of insertion of the chip card the chip card 1 will not be blocked in the card slot of the card reader. The radius of curvature in and/or crosswise to the direction of insertion of the chip card 1 into the card reader for the countercontacts 20, . . . , 27, and the spacing 30 between contacts 10, . . . , 17 which are adjacent one another in the direction of insertion of the chip card 1 into the card reader, as well as the spacing 35 between contacts 10, 17 adjacent one another crosswise to the direction of insertion of the chip card 1 into the card reader, must all be selected such that when the countercontacts 20, . . . , 27 sweep over the contacts 10, . . . , 17 of the chip card 1, there will be no short circuit between individual contacts 10, 17.

Figure 6:
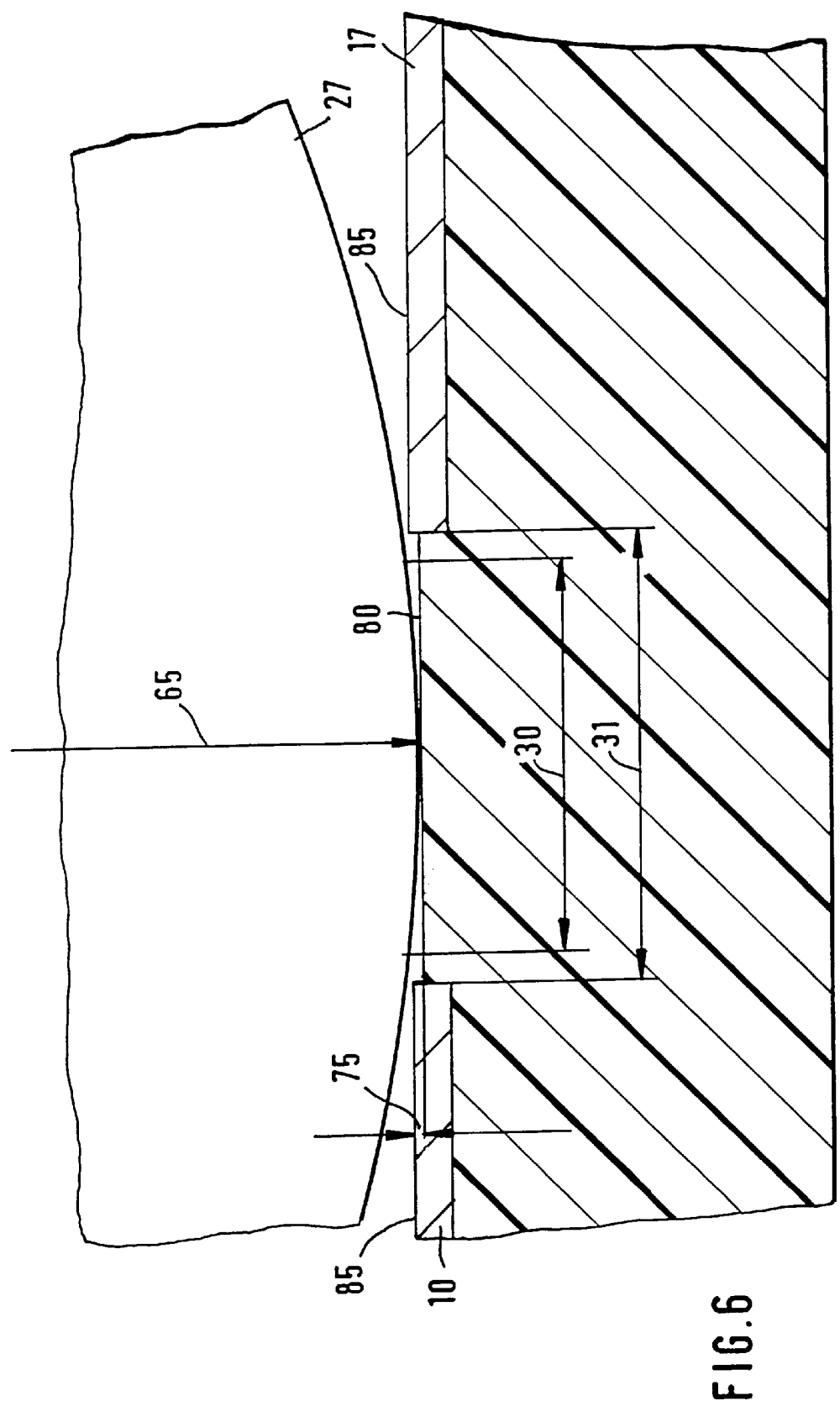
FIGS. 6 and 7 are detailed cross-sectional views of the chip card and card reader showing dimensions in the insertion direction and transverse to the insertion direction.
Figure 7:
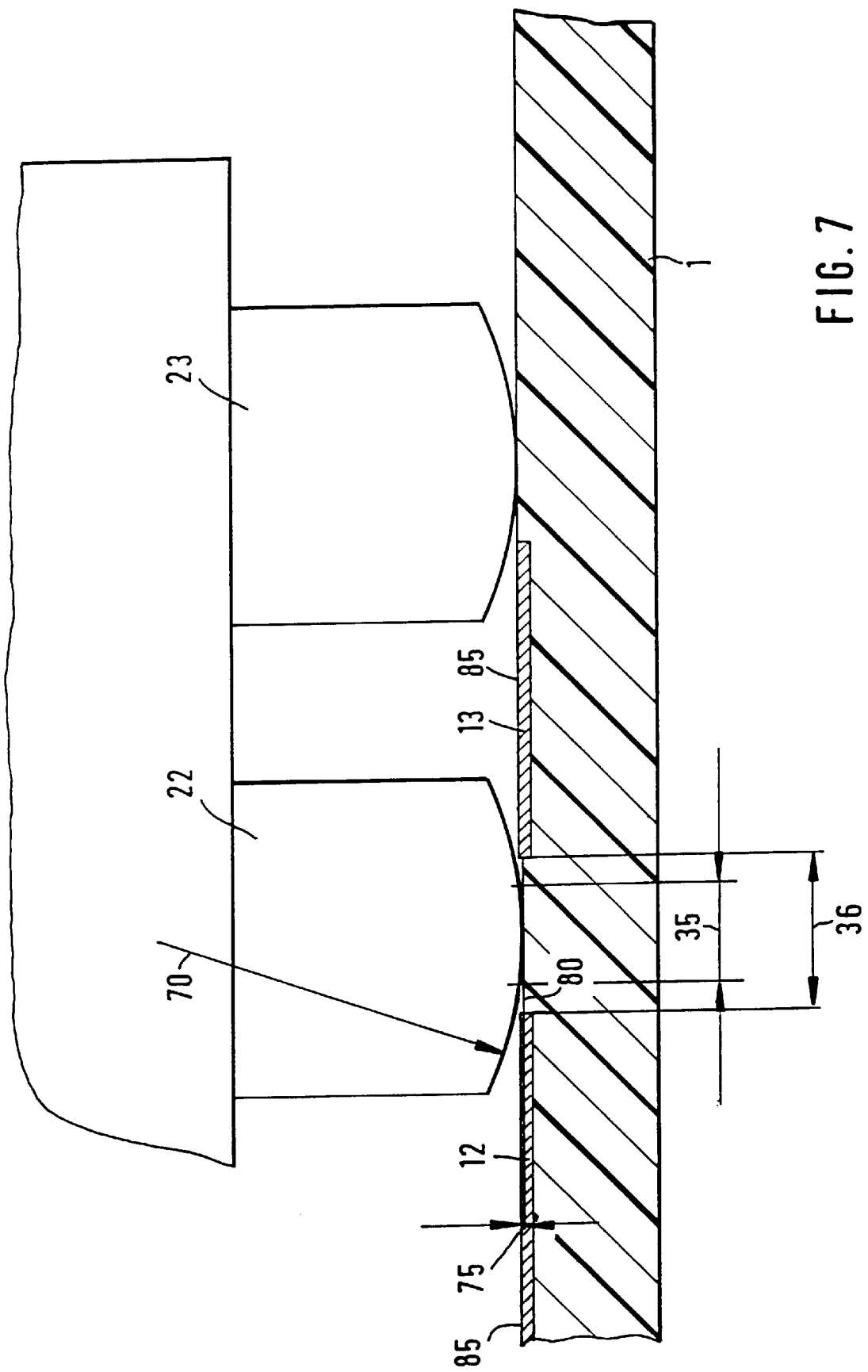

The corresponding requisite spacings and radii can be seen in FIGS. 6 and 7. To illustrate the dimensions, the detail of FIG. 4 has been enlarged further in FIG. 6. In FIG. 6, reference numeral 65 indicates the radius of curvature for the rounding off of the countercontacts 20, . . . , 27 in the insertion direction of the chip card 1, taking the eighth countercontact 27 as an example. In a modification of the detail of FIG. 4, the eighth countercontact 27 is here located precisely in the middle between the two contacts 10 and 17, adjacent one another in the insertion direction, on the surface 80 of the chip card 1, but without touching the two contacts 10 and 17. Thus the surface 80 of the chip card 1 determines the level at which the countercontacts 20, . . . , 27 rest.

Between the surface 85 of the contacts 10, . . . , 17 and the surface 80 of the chip card 1, there is a spacing 75. At an allowed maximum spacing 75 between the surface 85 of the contacts 10, . . . , 17 and the surface 80 of the chip card 1 of 0.018 mm and a radius of curvature in the direction of insertion of the chip card 1 of a maximum of 3.3 mm, the spacing 30 between the contacts 10, . . . , 17 that are adjacent one another in the direction of insertion of the chip card 1 into the card reader must be greater than 0.69 mm, so that there will be no short circuit between the individual contacts 10, . . . , 17 when the countercontacts 20, . . . , 27 sweep over the contacts 10, . . . , 17. For the spacing 30 between the contacts 10, . . . , 17 that are adjacent one another in the direction of insertion of the chip card 1 into the card reader, a value of 0.8 mm or 1 mm will be selected, for instance. The selected spacing is indicated by reference 31 in FIG. 6.

In FIG. 7, which shown a further enlargement of the detail of FIG. 5, reference numeral 70 indicates the radius of curvature of the countercontacts 20, . . . , 27 crosswise to the direction in which the chip card 1 is inserted into the card reader. In a modification of the detail of FIG. 5, the third countercontact 22 rests on the surface 80 of the chip card 1, precisely in the middle between the two contacts 12 and 13 adjacent one another crosswise to the insertion direction, without touching the two contacts 12 and 13. At a spacing 75 between the surface 85 of the contacts 10, . . . , 17 and the surface 80 of the chip card 1 of at most 0.018 mm and at a radius of curvature 70 of the countercontacts 20, . . . , 27 crosswise to the direction of insertion of at most 2 mm, the spacing 35 between contacts 10, . . . , 17 that are adjacent to one another crosswise to the insertion direction must be greater than 0.535 mm, in order that no short circuit will occur among individual contacts 10, . . . , 17 when the countercontacts 20, . . . , 27 sweep over the contacts 10, 17. For the spacing 35 between contacts 10, . . . , 17 that are adjacent crosswise to the insertion direction, a value of 0.6 mm is selected, for instance. This selected spacing is indicated in FIG. 7 by reference numeral 36.

To enable the electrical contacting to be maintained during an overshot occurring upon insertion or removal of the chip card 1, and/or during a time required to end a writing operation upon removal of the chip card 1 from the card slot and/or during reciprocation occurring crosswise to the direction of insertion of the chip card 1 into the card reader, upon insertion, removal or other motion of the chip card in the card slot, the contacts 10, . . . , 17 are longer than 5.5 mm in the direction of insertion of the chip card 1 and wider than 1.9 mm crosswise to the direction of insertion of the chip card 1 into the card reader. The dimensions of the contacts are limited by the size of the microchip module. insertion direction and 10 mm in width crosswise to the insertion direction, contacts 10, . . . , 17 can be made that are 6 mm in length in the insertion direction and 1.94 mm in width crosswise to the insertion direction.

What is claimed is:

1. A chip card comprising writing and/or reading contacts (10, 11, 12, 13, 14, 15, 16, 17) arranged on a surface of the chip card (1), said contacts acting to provide electrical contact with corresponding fixed countercontacts (20, 21, . . . , 27) of a card reader provided in a card slot when the chip card is received in the card slot, wherein said contacts (10, . . . , 17) fare dimensioned, formed and arranged on said surface so as to maintains have respective lengths and widths such that the electrical contact with said countercontacts (20, 21, . . . , 27) is maintained when said chip card moves to an overshot position (45) in said card slot beyond a terminal position (50) when said chip card is guided into the card slot of the card reader, and/or during a time required to end a writing operation upon removal of the chip card from the card slot, and/or during reciprocation transverse to an insertion direction of the chip card (1) into the card reader, occurring upon insertion or removal of the chip card (1).

2. The chip card as defined in claim 1, wherein spacings between the respective contacts (10, . . . , 17) are selected in relation to dimensions of said countercontacts (20, . . . , 27) so that, when the countercontacts (20, . . . , 27) sweep over the contacts (10, . . . , 17) as said chip card (1) is inserted into or removed from said card slot, no short circuit occurs between individual ones of said contacts (10, . . . , 17).

3. The chip card as defined in claim 1, wherein a spacing (30) between contacts (10, . . . , 17), which follow one another in the insertion direction of the chip card (1) into the card reader, is greater than a length of a corresponding countercontact face in said insertion direction.

4. The chip card as defined in claim 3, wherein another spacing (35) between contacts (10, . . . , 17), which are next to each other in a direction transverse to the insertion direction of the chip card (1) into the card reader, is greater than a length of the corresponding countercontact face in said direction transverse to the insertion direction of the chip card.

5. The chip card as defined in claim 4, wherein the spacing (30) between said contacts (10, . . . , 17), which follow one another in the insertion direction of the chip card (1) into the card reader, is greater than 0.69 mm; the another spacing (35) between said contacts (10, . . . , 17), which are next to each other in a direction transverse to the insertion direction of the chip card (1) into the card reader, is greater than 0.535 mm; that the contacts (10, . . . , 17) are longer than 5.5 mm in the insertion direction of the chip card (1) into the card reader; that the contacts (10, . . . , 17) are wider than 1.9 mm in said direction transverse to the insertion direction of the chip card (1) into the card reader; and that a spacing of at most 0.018 mm is present between a surface of the contacts (10, . . . , 17) and an adjacent surface of the chip card defining a level at which the countercontacts (20, . . . , 27) rest.

6. A chip card comprising writing and/or reading contacts (10, 11, 12, 13, 14, 15, 16, 17) arranged on a surface thereof, said contacts acting to provide electrical contact with corresponding fixed countercontacts (20, 21, . . . , 27) arranged in a card slot provided in a card reader when the chip card is received in the card slot, wherein said contacts (10, . . . , 17) are each longer than 5.5 mm in an insertion direction of the chip card (1) into the card slot, spacings (30) between adjacent pairs of said contacts (10, . . . , 17) in said insertion direction are each greater than a length of a corresponding countercontact face in said insertion direction and said spacings (30) in said insertion direction between said adjacent pairs of said contacts (10, . . . , 17) are each greater than 0.69 mm;

so that said electrical contact between said contacts (10, . . . , 17) and said countercontacts (20, . . . , 27) is maintained, when said chip card moves to an overshoot position (45) in said card slot beyond a terminal position (50) when said chip card is inserted into said card reader, and during a time required to end a writing operation when said chip card is withdrawn from said card reader.

7. A card reader for a chip card with writing and/or regarding contacts, wherein said card reader comprises fixed countercontacts (20, . . . , 27) arranged in a card slot of the card reader for mechanical cooperation with the writing and/or reading contacts (10, . . . , 17) on the chip card and for electrically conductive connection of a computer to the contacts (10, . . . , 17) when the chip card is received in the card slot, spacings (35) between adjacent pairs of said contacts (10, . . . , 17) in a direction transverse to said insertion direction are each greater than 0.535 mm, said slot, wherein said contacts (10, . . . , 17 are each wider that 1.9 in said direction transverse to said insertion direction of said chip card (1) into the card reader, spacings (35) between said adjacent pairs of said contacts (10, . . . , 17) in said insertion direction are each greater than a length of a corresponding countercontact face in said direction transverse to said insertion direction, said countercontacts (20, . . . , 27) are rounded off in said insertion dircetion of the chip card (1) into the card reader and have a radius of curvature (70) in the direction transverse to the insertion direction selected so that, when the countercontacts (20, . . . , 27) sweep over the contacts (10, . . . , 17) of the chip card (1), no two of said contacts (10, . . . , 17) of the chip card (1) are ever simultaneously contacted by any one of said countercontacts, so that no short circuit occurs between any of said contacts (10, . . . , 17) and said radius of curvature is at most 2 mm.

8. A card reader for a chip card with writing and/or reading contacts, said card reader comprising countercontacts (20, . . . , 27) for mechanical cooperation with the writing and/or reading contacts (10, . . . , 17) on the chip card and for electrically conductive countercontacts (20, . . . , 17) are rounded off in an insertion direction of the chip card (1) into the card reader and in a direction transverse to the insertion direction of the chip card (1) into the card reader, whereby electrical contact of the countercontacts with the contacts of the chip card is maintained as long as possible on insertion or removal of the chip card.

9. A card reader for a chip card with writing and/or reading contacts, said card reader comprising countercontacts (20, . . . , 27) for mechanical cooperation with the writing and/or reading contacts (10, . . . , 17) on the chip card and for electrically conductive connection of a computer to the contacts(10, . . . , 17), wherein said countercontacts (20, . . . , 27) are rounded of in an insertion direction of the chip card (1) into the card reader and in a direction transverse to the insertion direction of the chip card (1) into the card reader and said countercontacts have a radius of curvature in the insertion direction of the chip card into the card reader amounting to at most 3.3 mm and a radius of curvature in a direction transverse to the insertion direction of the chip card into the card reader of at most 2 mm.

* * * * *